United States Patent Office.

JUSTUS WOLFF, OF ALBANY, NEW YORK, ASSIGNOR TO THE ALBANY ANILINE AND CHEMICAL WORKS, OF SAME PLACE.

MANUFACTURE OF CARDINAL-RED COLORING-MATTER.

SPECIFICATION forming part of Letters Patent No. 285,335, dated September 18, 1883.

Application filed April 19, 1883. (No specimens.)

*To all whom it may concern:*

Be it known that I, JUSTUS WOLFF, a citizen of Great Britain, residing at Albany, in the county of Albany and State of New York, have invented certain new and useful Improvements in the Production of Cardinal-Red Coloring-Matter, of which the following is a specification.

My invention relates to the production of cardinal-red dyeing-matter by the action of diazo-naphthaline-amido-benzole sulphonate of ammonia on beta-naphthol disulphonate of sodium, and is based upon a principle similar to that involved in my application for diazo-amido scarlet, filed October 30, 1882.

In order to carry out my invention, I dissolve one equivalent of naphthylamine in two equivalents of hydrochloric acid and a quantity of water sufficient to completely dissolve this compound. After this I add slowly, while cold, one equivalent of sodium nitrite dissolved in from five to eight times its weight of water. When all of the latter is added, I let the compound stand for an hour or two, and then I add, while cold and stirring, a solution of one equivalent of ammonia amido-benzole-sulphonate in from eight to ten times its weight of water. After having mixed thoroughly I add the solution of diazo-naphthaline-amido-benzole sulphonate of ammonia thus obtained to a cold solution of one equivalent of beta-naphthol disulphonate of sodium in about ten or twelve parts of its own weight of water while stirring. Then I add one equivalent of ammonia, and after having stirred for some time I add a sufficient quantity of salt to precipitate the diazo-amido cardinal formed.

The coloring-matter, precipitated by salt, filtered, and dried, contains in its molecule the diazo-naphthaline combined with the amido-benzole-sulphonate forming the diazo-naphthaline-amido-benzole sulphonate of ammonia, which, in combination with the beta-naphthol disulphonate of sodium, forms the coloring-matter which is the object of my invention. Thus it will be seen that my new coloring-matter is distinguished from all others by its constitution, as it contains, besides the diazo compound of naphthaline, the amido-benzole sulphonate compound with the beta-naphthol sulphonate.

What I claim as new, and desire to secure by Letters Patent, is—

As a new article of manufacture, a cardinal-red coloring-matter containing in its molecule the diazo-naphthaline-amido-benzole sulphonate of ammonia, combined with the beta-naphthol disulphonate of sodium, and having the molecular composition as herein set forth.

In testimony whereof I affix my signature in presence of two witnesses.

JUSTUS WOLFF.

Witnesses:
WM. M. SHUSTER, Jr.,
WM. HELMICK.